United States Patent
Leon et al.

(10) Patent No.: US 10,301,973 B2
(45) Date of Patent: May 28, 2019

(54) DEVICE FOR RETAINING DRAINED FLUIDS FOR A PROPULSIVE ASSEMBLY

(71) Applicant: Snecma, Paris (FR)

(72) Inventors: Alexandre Leon, Moissy-Cramayel (FR); Gilles Brun, Moissy-Cramayel (FR)

(73) Assignee: Safran Aircraft Engines, Paris (FR)

(*) Notice: Subject to any disclaimer, the term of this patent is extended or adjusted under 35 U.S.C. 154(b) by 407 days.

(21) Appl. No.: 15/100,225

(22) PCT Filed: Dec. 2, 2014

(86) PCT No.: PCT/FR2014/053136
§ 371 (c)(1),
(2) Date: May 27, 2016

(87) PCT Pub. No.: WO2015/082833
PCT Pub. Date: Jun. 11, 2015

(65) Prior Publication Data
US 2017/0002689 A1    Jan. 5, 2017

(30) Foreign Application Priority Data
Dec. 4, 2013    (FR) .................. 13 62079

(51) Int. Cl.
*F01D 25/32*    (2006.01)
*F01D 25/24*    (2006.01)
(Continued)

(52) U.S. Cl.
CPC ............ *F01D 25/32* (2013.01); *B64C 1/1453* (2013.01); *B64D 29/00* (2013.01); *F01D 25/24* (2013.01);
(Continued)

(58) Field of Classification Search
CPC .......... F01D 25/24; F01D 25/32; F01D 25/34; F02K 3/06; B64C 1/1453; B64D 29/00;
(Continued)

(56) References Cited

U.S. PATENT DOCUMENTS 4,506,851 A * 3/1985 Gupta ................. B64C 1/1453
                                                   137/244
4,715,561 A * 12/1987 Spinosa ............... B64C 1/1453
                                                   137/430
(Continued)

FOREIGN PATENT DOCUMENTS

WO    98/12107 A1    3/1998

OTHER PUBLICATIONS

Written Opinion of the International Searching Authority dated May 6, 2015, issued in corresponding International Application No. PCT/FR2014/053136, filed Dec. 2, 2014, 7 pages.
(Continued)

Primary Examiner — Igor Kershteyn
(74) Attorney, Agent, or Firm — Christensen O'Connor Johnson Kindness PLLC

(57) ABSTRACT

A device for retaining drained fluids for a propulsive assembly includes a cavity for storing the drained fluids and two walls mounted at the opening of said cavity. The cavity has a fluid storage volume V1 when the device is in a substantially vertical position, and each wall is configured such as to define a fluid storage volume (V2 and V3 respectively) in the cavity when the device is in a substantially horizontal position, each of the volumes V2 and V3 being at least equal to the volume V1.

10 Claims, 3 Drawing Sheets

(51) Int. Cl.
*F02K 3/06* (2006.01)
*B64C 1/14* (2006.01)
*B64D 29/00* (2006.01)

(52) U.S. Cl.
CPC .......... *F02K 3/06* (2013.01); *F05D 2220/323* (2013.01); *F05D 2250/75* (2013.01); *F05D 2260/602* (2013.01)

(58) Field of Classification Search
CPC ........... F05D 2220/323; F05D 2250/75; F05D 2260/602
See application file for complete search history.

(56) References Cited

U.S. PATENT DOCUMENTS

| | | | | |
|---|---|---|---|---|
| 5,054,282 A | * | 10/1991 | Costa | F02C 7/232 220/374 |
| 5,095,617 A | * | 3/1992 | Costa | F01M 13/00 29/513 |
| 5,104,069 A | * | 4/1992 | Reising | B64D 1/16 244/129.1 |
| 5,285,636 A | | 2/1994 | Mayo et al. | |
| 6,571,562 B2 | * | 6/2003 | Wilcox | F01M 11/04 244/129.1 |
| 6,578,361 B1 | * | 6/2003 | Higginbotham | F01D 5/005 60/39.094 |
| 7,121,512 B2 | * | 10/2006 | Bonnaud | B64C 1/1453 244/136 |
| 7,651,055 B2 | * | 1/2010 | Turner | B64C 1/1453 244/129.1 |
| 8,328,504 B2 | * | 12/2012 | Russell | B64D 29/00 244/129.1 |

OTHER PUBLICATIONS

International Preliminary Report on Patentability dated Jun. 7, 2016, issued in corresponding International Application No. PCT/FR2014/053136, filed Dec. 2, 2014, 1 page.
International Search Report dated May 6, 2015, issued in corresponding International Application No. PCT/FR2014/053136, filed Dec. 2, 2014, 6 pages.
Written Opinion dated May 6, 2015, issued in corresponding International Application No. PCT/FR2014/053136, filed Dec. 2, 2014, 5 pages.

* cited by examiner

DEVICE FOR RETAINING DRAINED FLUIDS FOR A PROPULSIVE ASSEMBLY

TECHNICAL FIELD

The present invention relates to a device for retaining drained liquids for a propulsion assembly, these liquids being, for example, oil, water and/or fuel.

PRIOR ART

The prior art includes the documents U.S. Pat. No. 5,285,636 and WO-A1-98/12107.

An aeroplane propulsion assembly generally has means for draining liquids (oil, water and/or fuel) from the engine to prevent these liquids from collecting and disrupting the operation of the engine. The oil and fuel are drained owing to the fact that the dynamic seal technologies (pumps, AGBs, chokes, actuators, etc.) do not allow for perfect sealing. Therefore, the liquids that pass through the dynamic seals have to be drained to prevent them leaking into the engine. The water is drained to prevent water-retention areas, which often lead to corrosion.

In the current state of the art, the drained liquids can be discharged directly to the outside. The means for draining the liquids from the engine can also be connected by conveying means, such as ducts, to a retaining box comprising a cavity for storing the drained liquids. This retaining box is located within the propulsion assembly. It is attached to the engine and is generally located in the lower portion of the propulsion assembly so that the drained liquids flow into the conveying means and into the storage cavity as a result of gravity.

The propulsion assembly further comprises a drainage mast for discharging the drained liquids to the outside. This mast is supported by the nacelle and protrudes towards the outside of the nacelle. Said mast is also located in the lower portion of the propulsion assembly, facing the retaining box, and collects liquids exiting the box. The mast comprises a lower end comprising an orifice for discharging the liquids to the outside of the nacelle. When the storage cavity in the retaining box is emptied, the liquids are discharged as far as to the opening in the mast and then discharged to the outside of the propulsion assembly.

In some propulsion assemblies, the opening kinematics of the cowls does not give manual access to the retaining box, nor does it allow for a leak-tight hydraulic connection between the conveying means and said box. It would be conceivable to not equip said propulsion assemblies with a retaining box, in which case the outlets of said conveying means would open directly opposite the mast and would discharge the drained liquids in the region of the mast as soon as said liquids are collected. However, some aircraft manufacturers want their turbine engines to have boxes for retaining the drained liquids, in particular in order to have better control over the time at which said liquids are discharged to the outside of the propulsion assembly.

One solution to this problem would consist in integrating the retaining box in the drainage mast; said mast would therefore comprise a cavity for storing the liquids. However, the drainage mast is attached to a detachable cowl of the nacelle, which has a shape of a portion of a cylinder and is hinged along one of its longitudinal edges about a substantially horizontal axis. The cowl can be moved from a closed position of the nacelle, in which the mast is in the low position and has a substantially vertical orientation, into an open position of the nacelle (for example for a maintenance operation), in which the cowl has been moved by an angle of approximately +90° about its hinge axis and the mast is in the lateral position and has a substantially horizontal orientation. If the mast were to comprise liquids in its cavity, said liquids would be discharged to the ground while the cowl is moved and opened, which is problematic.

If the aircraft has two lateral turbine engines, these two turbine engines are affected by this problem. The nacelle cowl of one of the turbine engines can be moved by an angle of approximately +90° about its hinge axis and the nacelle cowl of the other turbine engine can be moved by an angle of approximately −90° about its hinge axis. Even if a solution was identified for retaining the liquids in the mast of one cowl, this solution would not necessarily be effective in retaining the liquids in the mast of the other cowl.

The present invention provides a simple, effective and economical solution to this problem.

SUMMARY OF THE INVENTION

For this purpose, the invention proposes a device for retaining drained liquids for a propulsion assembly, comprising a body defining a cavity that is intended for storing the drained liquids and has a volume $V1$ when the device is in a first position, for example substantially vertical, said cavity comprising an upper opening through which the liquids are conveyed into the cavity, characterised in that it comprises two walls in the region of said opening, a first wall designed to define a volume $V3$ for storing liquids in the cavity when the device is in a second position that is at a positive angle from the first position about a substantially horizontal axis, and a second wall designed to define a volume $V2$ for storing liquids in the cavity when the device is in a third position that is at a negative angle from the first position about a substantially horizontal axis, each volume $V2$ and $V3$ being at least equal to the volume $V1$.

The device according to the invention is particularly advantageous because the walls mounted in the region of the opening retain the drained liquids in the storage cavity and therefore prevent them from being discharged when the device is moved, regardless of the direction in which the device is moved, i.e. for example the opening direction of the nacelle cowl supporting said device. The storage volumes defined by the walls are at least equal to the specific volume of the cavity, which makes it possible to retain all the liquids even when the cavity is full.

In the present application, "positive angle" is understood to mean an angle of rotational movement in a direction about an axis of rotation, and "negative angle" is understood to mean an angle of rotational movement in the opposite direction about an axis of rotation.

According to one embodiment, the walls of the device are at least in part positioned one above the other and define a space therebetween.

The two walls may be an upper wall and a lower wall. The upper wall may define an orifice for introducing the liquids into said space.

Said orifice is preferably offset on one side from a vertical median plane of the cavity. As will be described in the following aspect, this makes it possible to increase the volume for storing liquids in the cavity.

The lower wall may extend below the orifice in the upper plate and define a passage for liquids from the space to the cavity. The liquids that pass through the orifice in the upper wall thus fall onto the lower wall and are guided to the cavity via the passage defined by the lower wall. This passage may be formed by a notch on a peripheral edge of the lower wall.

Said passage is preferably offset from the vertical median plane of the cavity on the side opposite that of the above-mentioned orifice in the upper wall. This also makes it possible to increase the volume for storing liquids in the cavity, as will be described in detail in the following.

The lower wall may be inclined relative to the upper wall. When the propulsion assembly is in operation, it is preferably inclined relative to a horizontal plane so that the liquids that fall onto the lower wall flow onto said wall from the above-mentioned passage as a result of gravity.

The device may comprise a duct for discharging the overflow of the cavity, one end of said duct leading into said space.

The walls are preferably metal plates or sheets. They may have a general parallelepiped shape. The walls may be attached to the body by welding or brazing.

The present invention also relates to a propulsion assembly, characterised in that it comprises a device as described above, said device being attached to a detachable nacelle cowl, which is hinged about a substantially horizontal axis to an element of the propulsion assembly.

As will be described in detail in the following, the device may be in the shape of a mast that is supported by the nacelle of the propulsion assembly and protrudes on the outer surface of the nacelle. This mast may have an aerodynamic profile.

DESCRIPTION OF THE DRAWINGS

The invention will be better understood and other details, features and advantages of the invention will become clear upon reading the following description given by way of non-limiting example and with reference to the accompanying drawings, in which.

DETAILED DESCRIPTION

In the following description, the terms "upstream" and "downstream" refer to the direction of flow of the gases in a propulsion assembly, the terms "radially inner" and "radially outer" refer to the longitudinal angle of the propulsion assembly, and the terms "lower" and "upper" are used to describe elements of a part when said part is in a substantially vertical position.

Figure 1:
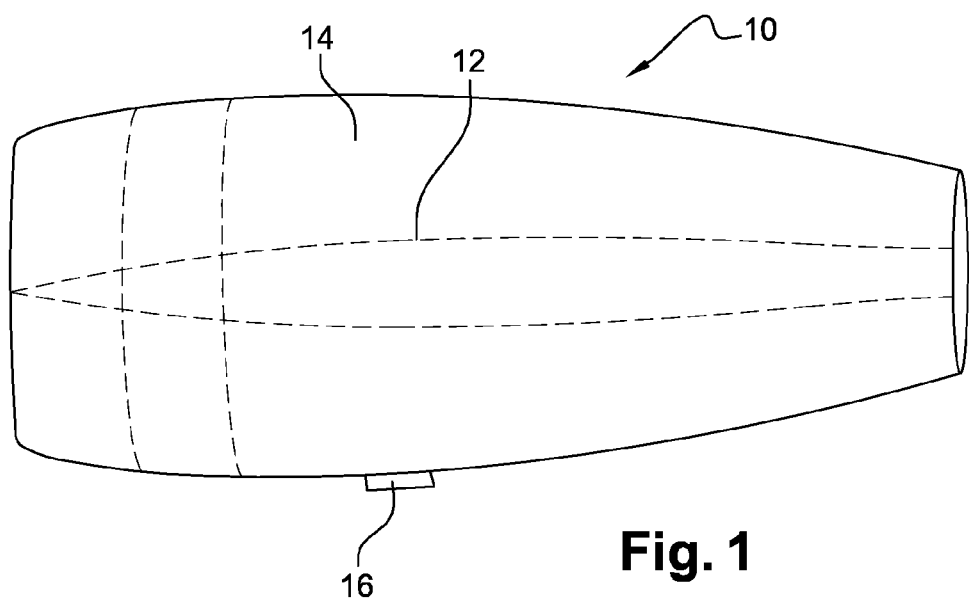
FIG. 1 is a schematic perspective view of an aircraft propulsion assembly according to the invention.
Figure 2:
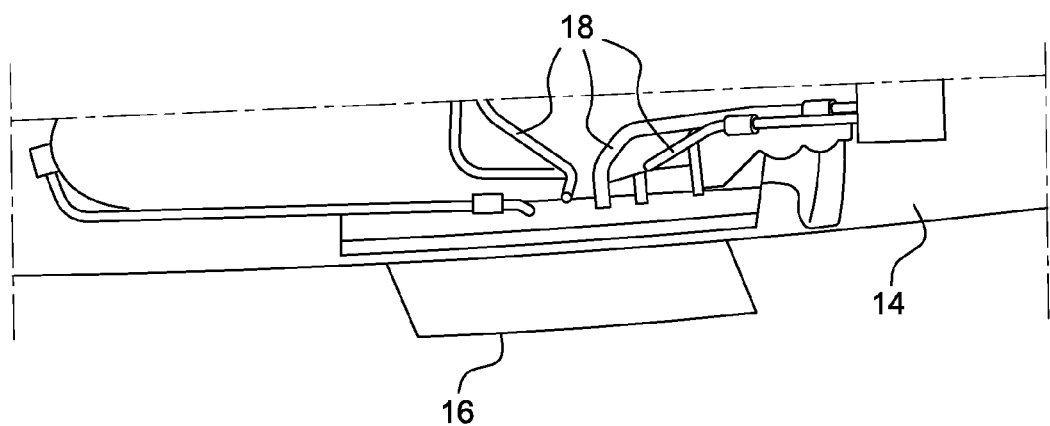
FIG. 2 is a schematic enlarged view in perspective and in axial section of part of the propulsion assembly of FIG. 1.

Reference is first made to FIG. 1, which shows an aircraft propulsion assembly 10 comprising an engine 12 (such as a bypass turbojet engine, shown schematically by dashed lines) surrounded by a nacelle 14.

The engine 12 comprises, from upstream to downstream in the direction of flow of the gases (from left to right in the drawing), a fan, a compressor, a combustion chamber, a turbine, and an exhaust nozzle for ejecting the combustion gases. The nacelle 14 comprises an air inlet, cowls and an inverter, which define the outer surface of the propulsion assembly.

The propulsion assembly 10 comprises a device 16 for retaining drained liquids, said device being in the shape of a mast 16 which is oriented substantially radially and protrudes on the outer surface of the nacelle 14. Said mast is located in the lower portion of the propulsion assembly, at 6 o'clock in terms of the dial of a clock.

Many types of liquid flow around the propulsion assembly 10, in particular fuel, oil for lubricating the bearings of the rotating parts, and water, which can be drawn in by the ventilation scoops or formed by the condensation in the engine.

During operation, said liquids are drained so that they do not collect and disrupt the operation of the propulsion assembly. The propulsion assembly comprises means for draining said liquids (such as drainage tubes), which are connected to the retaining mast 16 by means for conveying liquids, such as ducts 18.

Figure 3:
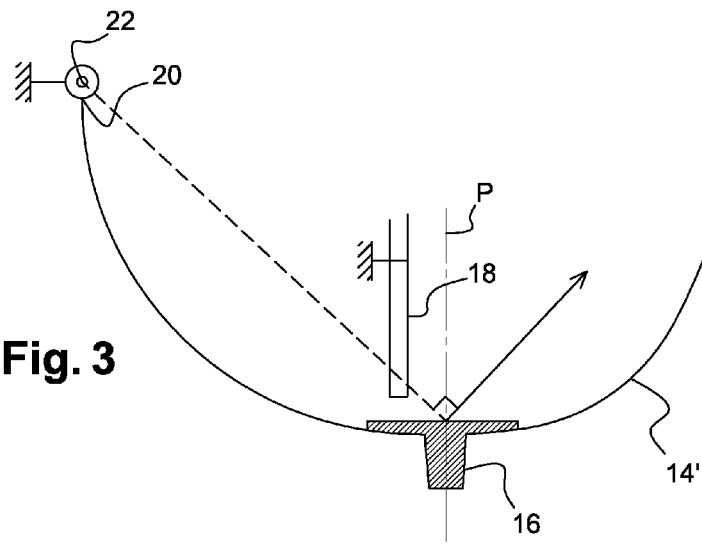
FIGS. 3 and 4 are highly schematic cross-sectional views of part of a turbine engine nacelle cowl, and show two different positions of this cowl: the closed position and open position of the nacelle, respectively.
Figure 4:
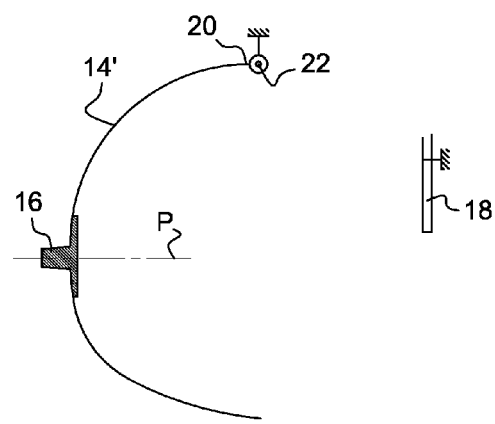

As schematically shown in FIGS. 3 and 4, the mast 16 is supported by a cowl 14' of the nacelle, said cowl 14' having in this case a semi-cylindrical shape and being hinged about a substantially horizontal axis 22 by one of its longitudinal edges 20. The cowl 14' may be rotated about the axis 22 from a closed position of the nacelle, shown in FIG. 3, to an open position of the nacelle, shown in FIG. 4. The angle between these two positions may be approximately 90°.

In the closed position in FIG. 3, the mast 16 is located under the ducts 18, which are rigidly connected to the engine, and its median plane P has a substantially vertical orientation. In the open position in FIG. 4, the mast 16 is located on the side (on the left in the drawing) and its median plane P has a substantially horizontal orientation. The ducts 18 rigidly connected to the engine do not prevent the liquids held in the mast 16 from being discharged to the ground.

If the nacelle shown in FIGS. 3 and 4 were to be provided on the propulsion assembly on one side of the aircraft, the propulsion assembly located on the other side of the aircraft would comprise a nacelle of which the mast would be located on the other side (on the right) if the cowl were in the open position of the nacelle.

The present invention proposes to overcome the disadvantages of the prior art by virtue of a retaining mast or device that ensures that the drained liquids it holds are retained, regardless of the (open or closed) position of the cowl supporting said device.

Figures 5, 6, 7:
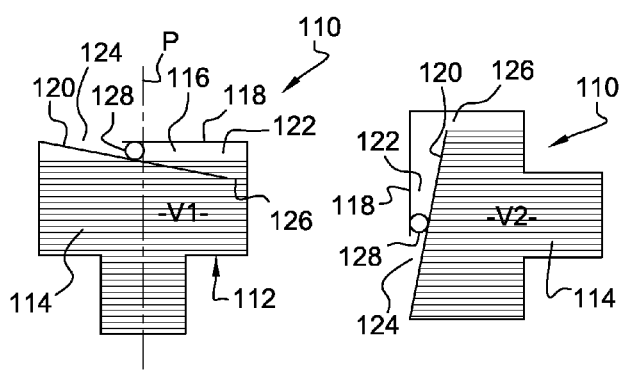
FIGS. 5 to 7 are highly schematic cross-sectional views of a device for retaining liquids according to the invention, and show three different positions of this device: vertical position, first horizontal position (the device being moved 90° in one direction) and second horizontal position (the device being moved 90° in the opposite direction), respectively.

FIG. 5 to 7 show, in a highly schematic manner, a device 110 for retaining drained liquids according to the invention.

The device 110 comprises a body 112 defining a cavity 114 for storing the drained liquids, said body comprising, in the upper portion thereof, an opening 116, through which the liquids are intended to be introduced into the cavity 114. According to the invention, two walls 118, 120 are mounted in the region of the opening 116 and are intended to ensure the retention of the liquids in the cavity in the above-mentioned positions, i.e. when the device is substantially horizontal.

The walls 118, 120 are respectively mounted one above the other and are therefore superposed. Said walls define a space 122 therebetween where the drained liquids that enter the device flow.

The upper wall 118 extends above the opening 116 and comprises an orifice 124 for introducing the liquids into the cavity. The wall 118 is substantially horizontal when the device 110 is in its operation position, i.e. in the position in FIG. 5.

The lower wall 120 is inclined relative to the upper wall 118 and therefore relative to the horizontal. The upper portion of the wall 120 is located directly below the orifice 124 and the lower portion thereof defines, together with the body, a passage 126 for the liquids to flow from the space 122 to the cavity 114.

As can be seen in FIG. 5, the orifice 124 in the upper wall 118 is offset on one side from a vertical median plane P of the device, and the passage 126 defined by the lower wall 120 is offset on the other side from said plane P.

The cavity 114 defined by the body has a volume V1. This volume V1 is defined when the device 110 has a vertical orientation, as shown in FIG. 5. This volume V1 depends in particular on the shape and the dimensions of the body, but also on the position of the means 128 for discharging the overflow of the cavity. In the example shown, these means 128 lead into the space 122 between the walls 118, 120.

The lower wall 120 is designed to define a volume V2 for storing liquids in the cavity 114 when the device 110 is oriented substantially horizontally, in the position shown in FIG. 6 (movement of the cowl supporting the device by +90° for example about its axis of rotation). This volume V2 depends in particular on the shape and the dimensions of the body, but also on the position, the shape and the dimensions of the passage 126 defined by the wall 120. The offset of the passage 126 from the plane P thus makes it possible to increase the volume V2. This volume V2 is greater than or equal to the volume V1.

The upper wall 118 is designed to define a volume V3 for storing liquids in the cavity 114 when the device 110 is oriented substantially horizontally, in the position shown in FIG. 7 (movement of the cowl carrying the device by −90° for example about its axis of rotation). This volume V3 depends in particular on the shape and the dimensions of the body, but also on the position, the shape and the dimensions of the orifice 124 and the means 128. The offset of the orifice 124 from the plane P thus makes it possible to increase the volume V3. This volume V3 is greater than or equal to the volume V1.

Figure 8:
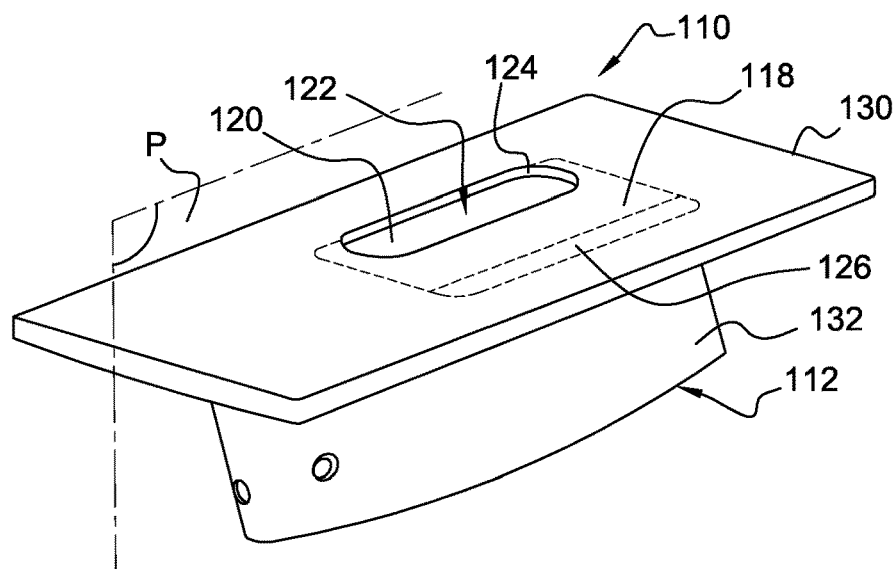
FIGS. 8 and 9 are schematic perspective views of an embodiment of the device according to the invention.
Figure 9:
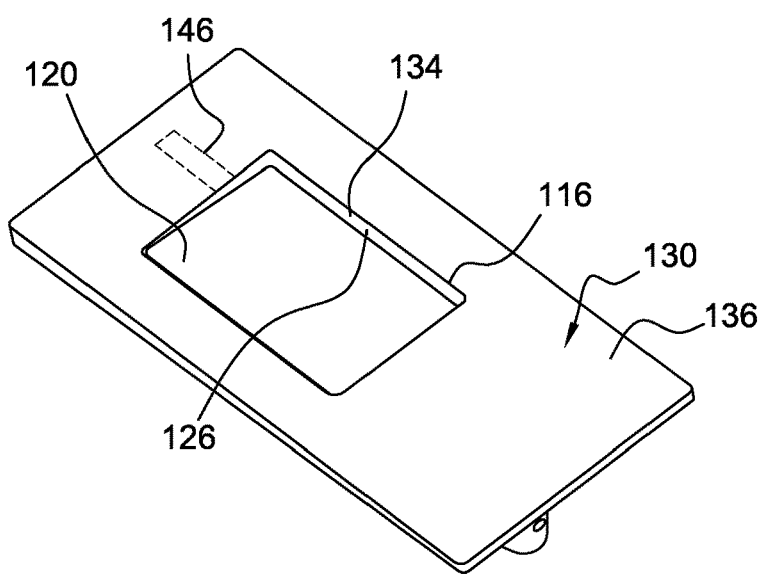

FIGS. 8 and 9 show an embodiment of the retaining device 110 according to the invention, said device 110 being, in this case, in the shape of a mast comprising an upper plate 130 for attachment to the cowl of the nacelle and a lower profiled portion 132 that is intended to protrude substantially radially on the outer surface of the cowl. The plate 130 and the profiled portion 132 are in this case formed by a one-piece body 112.

The profiled portion 132 is hollow and inside comprises a compartment defining the majority of the volume of the cavity of the device.

The plate 130 has a substantially parallelepiped shape and is arranged substantially horizontally in the operation position. It comprises, substantially in the middle thereof, a substantially parallelepiped recess 134 which extends above the compartment of the profiled portion 132 and communicates with said compartment in order to define the cavity of the device. The recess 134 opens onto the upper surface 136 of the plate 130 and forms the opening 116 in the cavity.

The plate 130 further comprises a duct 146 for discharging the overflow of the cavity, which duct leads into the recess 134. The duct 146 is formed in the body of the plate 130 and its upper end leads onto the upper surface 136 of the plate.

As described above, the device 110 comprises two walls 118, 120 that in this case are in the shape of plates and are mounted in or on the recess 134 in the device.

The upper plate 118 is shown in FIG. 8, which also shows the lower plate 120. Only the lower plate 120 is shown in FIG. 9.

The upper plate 118 (FIG. 8) has a general rectangular shape and is intended to be attached, for example by welding, to the plate 130 in order to cover the recess 134. It extends substantially in parallel with the upper surface 136 of the plate and is therefore substantially horizontal during operation. The upper plate 118 here covers almost all of the upper surface 136 of the plate and closes the upper end of the duct 146. Sealing between the plate 118 and the upper surface 136 of the plate can be provided to ensure good retention of the liquids in the three positions.

This plate 120 comprises an orifice 124 for introducing the drained liquids into the cavity. In the example shown, this orifice 124 has an elongate shape along one of the sides of the recess 134.

The lower plate 120 (FIGS. 8 and 9) has a general rectangular shape and is intended to be mounted inside the recess 134. The plate 120 is preferably attached, for example by welding, to the plate 118.

The plates 118, 120 define a space 122 therebetween where the drained liquids flow (FIG. 8) and into which an end of the overflow 146 leads (FIG. 9).

The plate 120 defines a passage 126 for the drained liquids from the space 122 to the cavity. As can be seen in FIG. 9, the passage 126 is located on the side opposite the orifice 124 with respect to the plane P.

The plate 120 is inclined relative to the plate 118.

The drained liquids are guided by the ducts 18 and flow through the orifice 124 in the plate 118. Said liquids fall onto the lower plate 120 and, as a result of gravity, flow to the passage 126 and then into the cavity.

In the example shown, when the device 110 is in the operation position, in which the median plane P thereof is vertical, the maximum volume of the liquids stored in the cavity corresponds to the volume which the liquids reach in the region of the plate 120.

When the device 110 comprising the volume of liquids is moved into a first horizontal position as shown in FIG. 6 (and is subjected to a movement of +90° for example, the median plane P thereof being horizontal), the majority or the entirety of the volume of liquids is retained by the lower plate 120 and the rest passes through the passage 126 into the space 122 between the plates.

When the device 110 comprising the volume of liquids is moved into a second horizontal position as shown in FIG. 7 (and is subjected to a movement of −90° for example, the median plane P thereof being horizontal), a relatively large portion of the volume passes through the passage defined by the passage 126 into the space 122 between the plates and is retained by the upper plate 118.

The invention claimed is:

1. Device for retaining drained liquids from a propulsion assembly, comprising a body defining a cavity that is configured to store the drained liquids and has a volume V1 when the device is in a first position, said cavity comprising an upper opening through which the liquids are conveyed into the cavity, wherein the cavity comprises two walls in the region of said opening that are at least in part positioned one above the other and define a space therebetween, a first wall designed to define a volume V3 for storing liquids in the cavity when the device is in a second position that is at a positive angle from the first position about a substantially horizontal axis, and a second wall designed to define a volume V2 for storing liquids in the cavity when the device is in a third position that is at a negative angle from the first position about a substantially horizontal axis, each volume V2 and V3 being at least equal to the volume V1.

2. Device according to claim 1, wherein the two walls are an upper wall and a lower wall, the upper wall defining an orifice for introducing the liquids into said space.

3. Device according to claim 2, wherein said orifice is offset on one side from a vertical median plane (P) of the cavity.

4. Device according to claim 2, wherein the lower wall extends below the orifice in the upper plate and defines a passage for liquids from the space to the cavity.

5. Device according to claim 4, wherein said passage is offset from the vertical median plane (P) of the cavity on the side opposite that of said orifice.

6. Device according to claim 2, wherein the lower wall is inclined relative to the upper wall.

7. Device according to claim 1, further comprising a duct for discharging the overflow of the cavity, one end of said duct leading into said space.

8. Device according to, claim 1, wherein the walls are attached to the body by welding or brazing.

9. Propulsion assembly, comprising a device according to claim 1, said device being attached to a detachable cowl of a nacelle, which is hinged about a substantially horizontal axis to an element of the propulsion assembly.

10. Device according to claim 1, wherein the first position is a substantially vertical position.

\* \* \* \* \*